United States Patent [19]

Krampe

[11] Patent Number: 5,131,299
[45] Date of Patent: Jul. 21, 1992

[54] INSULATION STRIPPING TOOL

[76] Inventor: Franz Krampe, Bergstrasse 5, D-4715 Ascheberg-Herbern, Fed. Rep. of Germany

[21] Appl. No.: 613,476
[22] PCT Filed: Mar. 5, 1990
[86] PCT No.: PCT/EP90/00323
  § 371 Date: Oct. 26, 1990
  § 102(e) Date: Oct. 26, 1990
[87] PCT Pub. No.: WO90/10329
  PCT Pub. Date: Sep. 7, 1990

[30] Foreign Application Priority Data

Mar. 4, 1989 [DE] Fed. Rep. of Germany ... 8902643[U]
Jul. 4, 1989 [DE] Fed. Rep. of Germany ....... 3922016

[51] Int. Cl.⁵ .............................................. H02G 1/12
[52] U.S. Cl. ..................................................... 81/9.43
[58] Field of Search ...................... 81/9.4, 9.41, 9.43, 81/9.44; 30/90.1

[56] References Cited

U.S. PATENT DOCUMENTS 4,341,134 7/1982 Yamazaki et al. ................... 81/9.41
4,557,164 12/1985 Krampe ................................ 81/9.41

FOREIGN PATENT DOCUMENTS 2060467 5/1981 United Kingdom .
2129360 5/1984 United Kingdom .

Primary Examiner—Roscoe V. Parker
Attorney, Agent, or Firm—Sprung Horn Kramer & Woods

[57] ABSTRACT

An insulation stripping tool with a lower and an upper arm 2, 3 connected at a first pivoting point 8 with the arms ending in a handle at one end. One of the arms 2, at its other end, ends in a jaw which is rigidly joined to the handle. The stripping tool includes another jaw which is part of the other arm 3; stripping blade carriers associated with the jaws of which at least one, together with the jaw, can be shifted with respect to the other stripping blade; and an expanding spring which has two elements and is supported around the first pivoting point and moves apart the handles. The operation of the stripping tool is characterized in that the lower arm 3 carries a pulling lever 16 in a second pivoting point 17, which is shifted with respect to the first pivoting point. The pulling lever 16 is provided with a support 15 for the one element 13 of the spreading spring 14 and further has a joint 22 which is disposed in the area of the upper arm of the tool. Further, there is a stripping blade carrier which can be moved with respect to the upper jaw and the inner side of which is connected to the joint of the pulling lever. Preferably, provision is made for a gripping jaw element 23 which can be moved with respect to the lower arm 3 and has a guide hole 36 in which the guide lug with the stripping blade carrier is guided.

6 Claims, 3 Drawing Sheets

INSULATION STRIPPING TOOL

BACKGROUND OF THE INVENTION

The invention relates to an insulation stripping tool.

A stripping tool according to the preamble is known from the German Patent No. 32 41 530. In this known stripping tool, an arm is guided and supported in a recess in the center portion of another arm. A cylindrical pin, which is loosely supported in oblong holes of the arms, serves as a common pivoting point for the pivoting and shifting of both arms. The pin and a multi-step expanding spring are used to move the arms against one another such that their gripping jaws are pressed against each other and the associated blades are brought into the cutting position. Subsequently, the blade of the movable arm, together with the arm itself, is pulled back with respect to the other arm in order to strip off the insulation.

This known stripping tool according to the German Patent No. 32 41 530 has been manufactured in numerous variants and has generally proven well. However, the arms of the tool, when pressed against each other, do not only execute a pivoting movement but also a translational movement. This impairs the execution of fine or minute operations with this tool since it moves in a manner unusual to the hand of the user. Moreover, it is difficult to accommodate a wire cutter within this structure in such a way that it is easily accessible.

SUMMARY OF THE INVENTION

The principal object of the invention is to redesign a stripping tool such that it permits the execution of minute operations and accommodates a wire cutter between the jaws in such a manner as to be easily accessible.

This object, as well as other objects which will become apparent from the discussion that follows, are accomplished with a stripping tool of the type described above having the following characteristics:

In contrast to the stripping tool according to prior art, the present invention makes use of a pulling lever which draws along a stripping blade carrier that can be moved with respect to the upper jaw, thus bringing this carrier into a stripping position.

As indicated, for example, in the published German Patent Application No. 24 02 187, it is known to make use of such a "driving pin" for both stripping blade carriers. However, this arrangement involves a relatively complicated interaction between numerous individual parts.

Further, another known stripping tool disclosed in the published German Patent Application No. 33 08 053 makes use of several springs and has a transmission lever the one end of which leads to an extension of the second clamping jaw. However, the transmission lever is not linked to an expanding spring but is connected to tension springs. This mechanism is therefore relatively complicated.

In the stripping tool according to the invention, the pulling lever is configured such that it interacts with the one arm of the expanding spring. By means of a corresponding enlargement of the contact surface for the expanding spring outside a connecting line "L" between the first and the second pivoting point, the pulling lever, together with its joint holding the stripping blade carrier, can provide a torque in the direction of the gripping jaws.

In the following description, the terms "upper", "lower", "front", and "end" are used. This terminology refers to the embodiment represented in the accompanying drawings as far as "upper" and "lower" are concerned. The jaws are disposed in the "front" whereas the handles can be found at the "end". As will be understood by a person skilled in the art, interacting parts can, mutatis mutandis, be also associated with respective other parts; for example, the blades with the corresponding blade carriers. In order to facilitate the understanding of the terminology used in the text, kinematic reversals are not always included in the general wording.

The preferred embodiments of the present invention will now be described with reference to the accompanying drawings.

DESCRIPTION OF THE PREFERRED EMBODIMENTS

Figure 1:
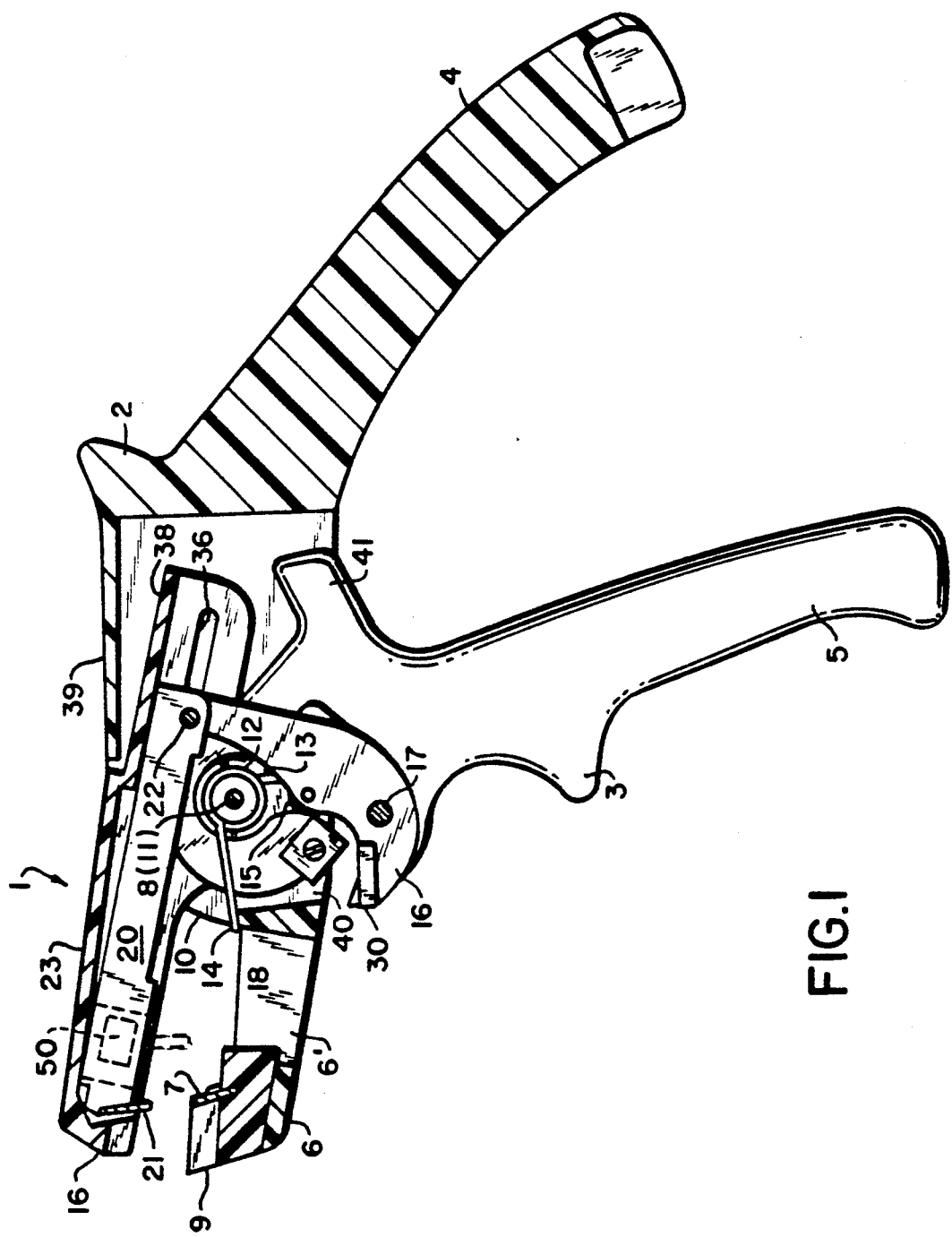
FIG. 1 is a side elevational view, partly in cross section, of a stripping tool according to a preferred embodiment in an open position.
Figure 2:
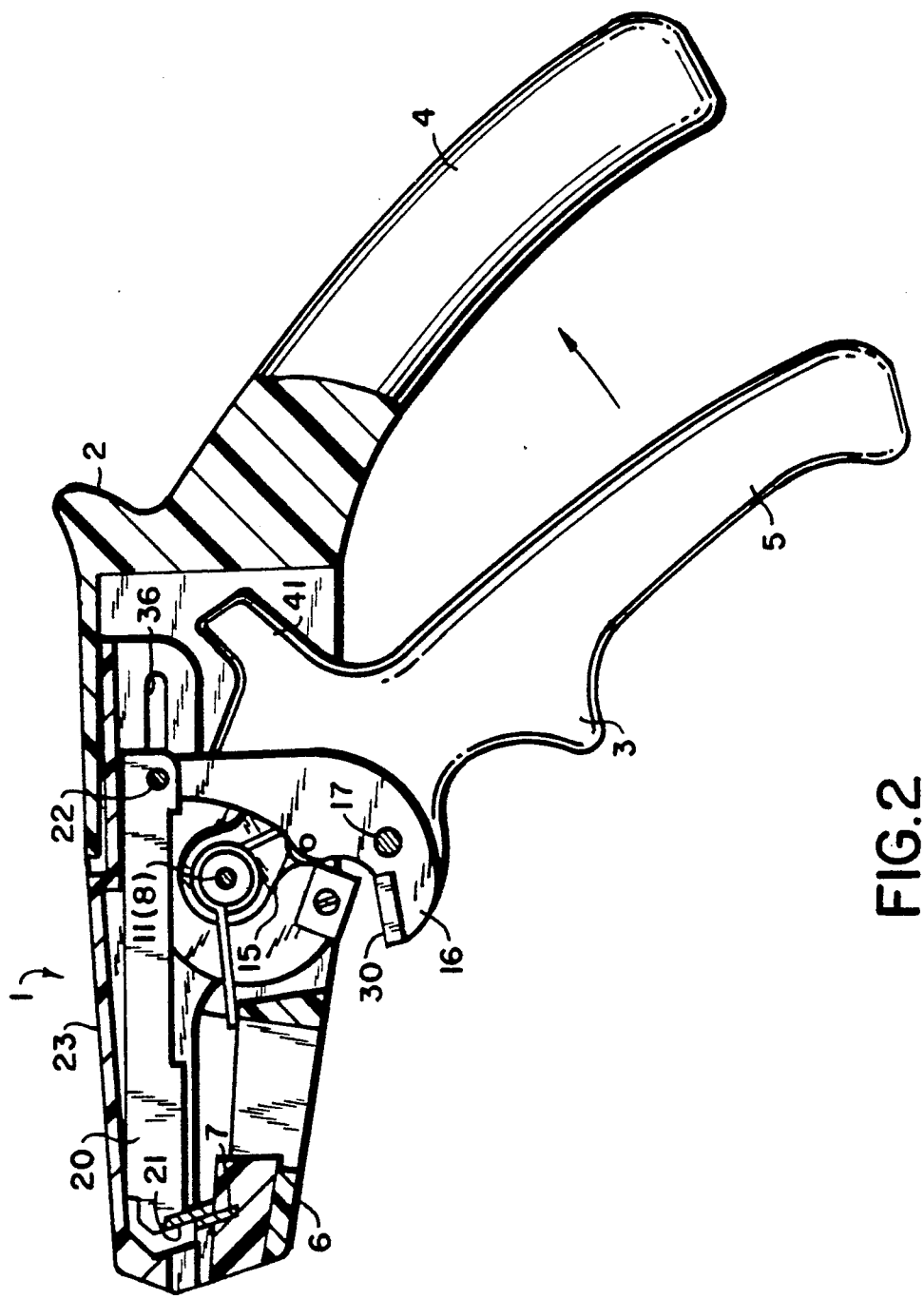
FIG. 2 is a side elevational view of the stripping tool of FIG. 1 in a closed position during the cutting.
Figure 3:
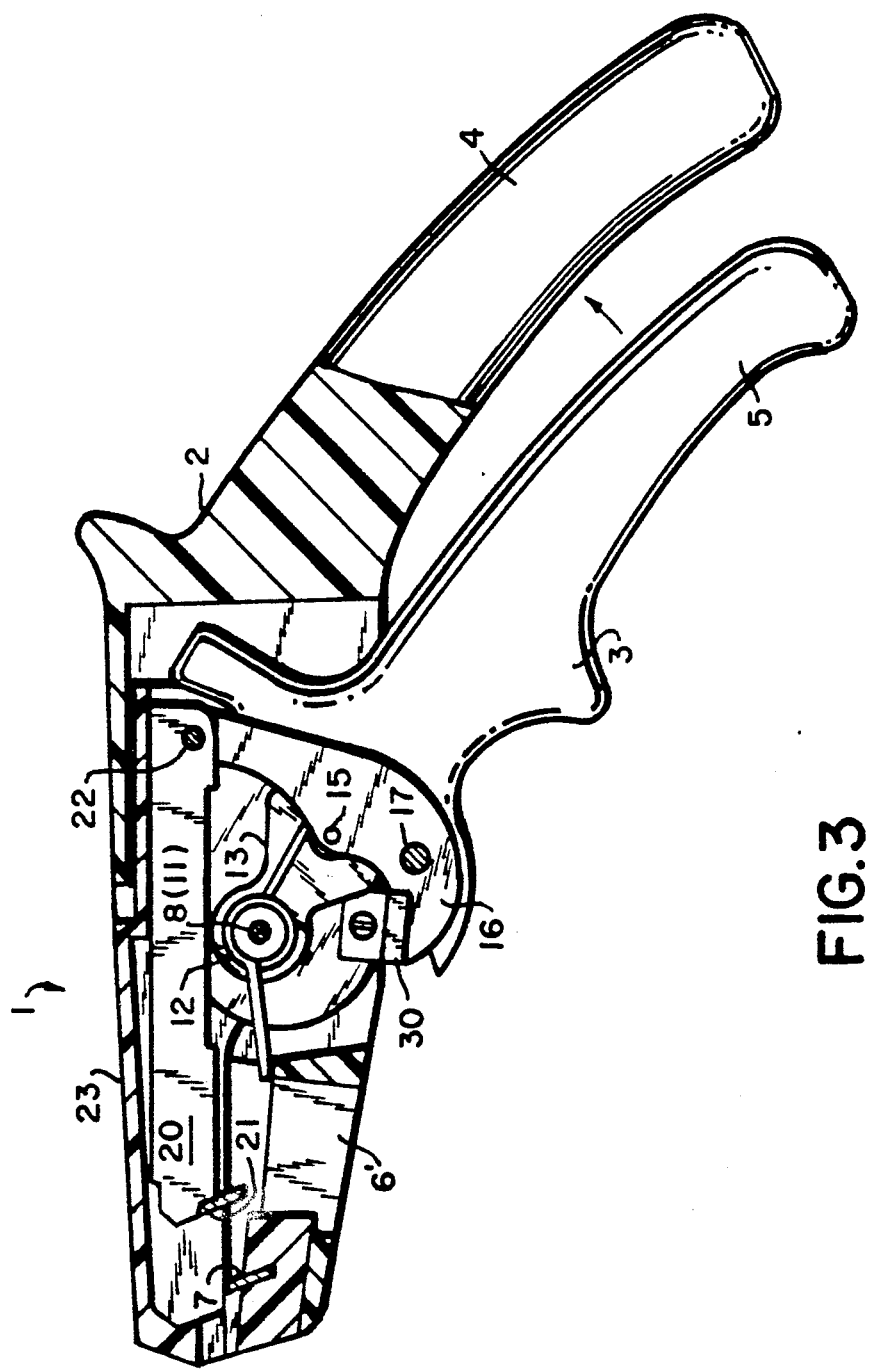
FIG. 3 is a side elevational view of the stripping tool of FIG. 1 while a cut off piece of a cable is stripped.

The insulation stripping tool 1 illustrated in FIGS. 1 to 3 essentially includes two arms 2 and 3 which at one end have handles 4 and 5, respectively. A connecting piece 6' rigidly joins the upper arm 2, together with its handle 4, to a lower jaw 6 as a one-piece connection. At the front end of the jaw 6 is a positioning blade 7 which is firmly connected to the jaw 6. In front of the positioning blade 7, is a channel 9 into which the end of a cable (not shown) is introduced. The handles and parts of the tool are hollow and partly double-walled so that the resulting interspaces can accommodate the additional, described parts.

The two arms 2 and 3 cross each other and are connected at a first pivoting point 8. The lower arm 3 comprises a handle 5 and a rounded center portion 10. The latter also supports a pivot 11 at the pivoting point 8. A coil spring, which is under tension and ends in two expanding elements 13, 14, is placed around the pivot 11. The one (front) expanding element 14 presses against a support 18 which is connected to the connecting piece 6' of the upper arm 2, whereas the other expanding arm 13 presses against an enlarged support pivot 15 resting on a pulling lever 16.

An essential part of the stripping tool is the pulling lever 16 which is disposed behind the first pivoting point 8 and which fulfills several functions. The pulling lever 16 has an approximately half-moon-like shape, and with its upper end 36', it extends over the center portion 10 to approximately the center of the upper arm 2. The pulling lever 16 is pivotably supported at a second pivoting point 17 which is provided in the center portion of arm 3 and is restricted in its pivoting movement. The pulling lever 16 also serves the purpose of transmitting the expanding force of the expanding spring 12 to the lower arm 3. Moreover, the external periphery of the support pivot 15 is disposed outside (behind) the connecting line L between the first and the second pivoting points 8 and 17, respectively. The arm 3 is thus expanded with respect to the other arm 2. At the same time, the pulling lever 16 is pushed toward the front, i.e. in direction to the jaw 6.

The counter element necessary for the jaw 6 is formed by an upper jaw 23 which is pivoted about the pivot point with respect to parts 10 and 12. The jaw 23 is an insulated part which has an upper guiding piece 38 at its rear end. This guiding piece rests against a corresponding lower part 39 of the arm 2 when the tool is closed. When the arms are open, the upper jaw 23 can execute a restricted pivoting movement with respect to the arm 2.

Further, the jaw 23 is equipped with an essentially horizontal oblong hole 36. The latter guides a lug 22 which, in turn, is attached to the upper end of the pulling lever 16 located in the region of the upper arm 2 or the jaw 23 and is connected to the rear end of a stripping blade carrier 20. The flexible connection via the lug 22, which in turn can be moved in its guide hole 36, enables the stripping blade carrier 20 to be horizontally moved. Due to the shifting of the lug 22 in its guide hole 36, the stripping blade carrier 20 is shifted to the right (as viewed in the drawing) when the arms are closed since the one end of the carrier 20 is connected to the pulling lever 16. The pulling is stopped at a closing stop and a cut off piece of a cable insulation is then removed.

The top end of the pulling lever, the one in the area of the upper arm 2 and the jaw 23, is connected to an end of the stripping blade carrier 20. This joint is established via a lug 22 which in turn can be moved in its guide hole 36. The latter is configured as a oblong hole and is located in the upper jaw 23. The movement of the pulling lever 16 is hence limited by the movement of the lug 22 in its guide hole 36. At the same time, the lug, at its front and rear stop inside the guide hole 36, can pull along the jaw 23 toward the front or the rear end.

The stripping blade carrier 20 which is guided in a movable manner with respect to the upper jaw 23 carries at its front end the stripping blade 21 which is compatible with the blade 7. The blades 7 and 21 are disposed such that, when the handles 4 and 5 are pressed towards each other, they first slightly cut in the cable covering which is therebetween, then continue cutting and allow it to be stripped. For this purpose, the blades 7 and 21 have a V-like shape, i.e. they are compatible with one another. Moreover, the stripping blade carrier 20 is equipped with a sled-like stopper/selector 50 for adjusting the stopping distances (broken lines in FIG. 1). This stopper/selector is connected to the stripping blade carrier 20 such that it can be shifted and locked in its position. It serves to determine the depth up to which the cable end can be introduced.

Further, in its lower area, the pulling lever 16, together with a correspondingly formed region of the arm 2, is configured as a wire cutter. A part of the pulling lever 16 is configured as a blade 30 which interacts with a counter blade 40 disposed at the arm 2. At the same time, the two cooperating blades 30 and 40 limit the closing movement of the two arms 2 and 3 when the latter contact each other.

The stripping tool according to the invention operates as follows:

When the stripping tool 1 of FIG. 1 is open, the two blades 7 and 21 are in their front positions. The lower blade 7 is then firmly connected to the jaw 6 whereas the upper blade 21 is firmly connected to the carrier 20; the connection to the upper jaw 23, however, allows a movement.

Assume, now, that the end of a cable is inserted up to the front side of a stopper/distance selector 50. When closing the handles 4, 5 against the force of the spring 12, the two jaws 6 and 23 move toward one another so that the blades 7 and 21 are closed with respect to each other, and the insulation of the cable, which is therebetween, is firmly held and cut. When the two jaws 6 and 23 are firmly pressed against each other, the two handles can still be further moved toward one another.

For this purpose, the upper end of the pulling lever 16 with the lug 22 is guided in the guide hole 36. The lug is hence shifted to the rear since the pulling lever is subject to a restricted guidance. A shifting of the lug 22 causes the upper stripping blade carrier 20 to be shifted to the right (as viewed in the drawing) since the one end of the carrier 20 is connected to the pulling lever 16. The pulling movement is carried on until the closing movement is completed when the two blades 30 and 40 are stopped. The partially cut and surrounded piece of cable is then removed from the remaining cable which is held between the jaws 6 and 23.

This position is illustrated in FIG. 3. Now, the stripping blade carrier 20 must not snap in the direction of the jaw 6 but must be advanced in a controlled way. For this purpose, the arms 2, 3 of the tool must first be opened. During this opening, the spring presses against the support pivot 15 and allows the pulling lever to turn counter-clockwise. The stripping blade carrier 20 is then pushed toward the front and assumes the initial position of FIG. 1. At the same time, the spring 12 supports the opening of both arms. When the these two arms are completely open, the carrier 20, in its guide hole 36, is pushed all the way to the front so that the blade 21 faces the blade 7 again.

It is important that the lower pivoting point 17 and the pivot 15 of the pulling lever, located above it, interact such that the movement of the pulling lever is carried out as described. This is accomplished in that the contact pressure point of the spring element is slightly shifted when the pulling lever is pivoting. As soon as the pulling lever has reached the right position of FIG. 1, the pivot 15 is located to the right of the pivoting point 17 so that the spring element 13 pushes down further. The contact point of the spring element changes again only after the jaw is open. The two handles 4, 5 can then move further apart.

There has thus been shown and described a novel insulation stripping tool which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. In an insulation stripping tool comprising (a) a lower arm and an upper arm rotatably connected together at a first pivoting point, the lower and upper arms each having two ends with one end forming a handle and the other end forming a jaw; (b) a first stripping blade associated with one jaw and a stripping blade carrier associated with the other jaw which can be shifted with respect to the first stripping blade; and (c) an expanding spring which includes two end elements and which is supported around the first pivoting point and applies a force to the handles tending to move them apart; the improvement wherein the lower arm carries a pulling lever at a second pivoting point which is displaced with respect to the first pivoting point, said pulling lever having a support for the one element of the expanding spring and a joint disposed adjacent the upper arm, and wherein said stripping blade carrier is movable with respect to the upper jaw and has an inner end connected to the joint of the pulling lever.

2. A stripping tool in accordance with claim 1, characterized in that the joint of the pulling lever is embodied in the form of a guide lug, and in that there is a jaw element which can be moved with respect to the lower arm and is provided with a guide hole in which the guide lug with the stripping blade carrier is guided.

3. A stripping tool in accordance with claim 2, characterized in that the stripping blade carrier carries a stopper/distance selector such that the latter can be moved.

4. A stripping tool in accordance with claim 1, characterized in that a portion of the pulling lever is configured as a blade interacting with a counter blade disposed at one of the arms.

5. A stripping tool in accordance with claim 1, characterized in that the support of the pulling lever for the element of the expanding spring is located outside a connecting line L between the first and the second pivoting points so that the pulling lever with its joint has a torque in direction to the blades.

6. A stripping tool in accordance with claim 1, characterized in that the lower arm is provided with a stopper which bounds against the pulling lever and limits the closing movement of the arms of the tool.

* * * * *